April 15, 1952 — R. F. RAYMOND ET AL — 2,592,601
TRANSPARENT ELECTROCONDUCTIVE ARTICLE
AND METHOD FOR PRODUCING THE SAME
Filed Feb. 5, 1948 — 3 Sheets-Sheet 1

INVENTORS.
RICHARD F. RAYMOND and
BROOK J. DENNISON.

BY Olen E Bee
ATTORNEY.

INVENTORS
RICHARD F. RAYMOND AND
BROOK J. DENNISON
BY Olen E. Bee
ATTORNEY.

April 15, 1952                R. F. RAYMOND ET AL                2,592,601
              TRANSPARENT ELECTROCONDUCTIVE ARTICLE
                AND METHOD FOR PRODUCING THE SAME
Filed Feb. 5, 1948                                 3 Sheets-Sheet 3
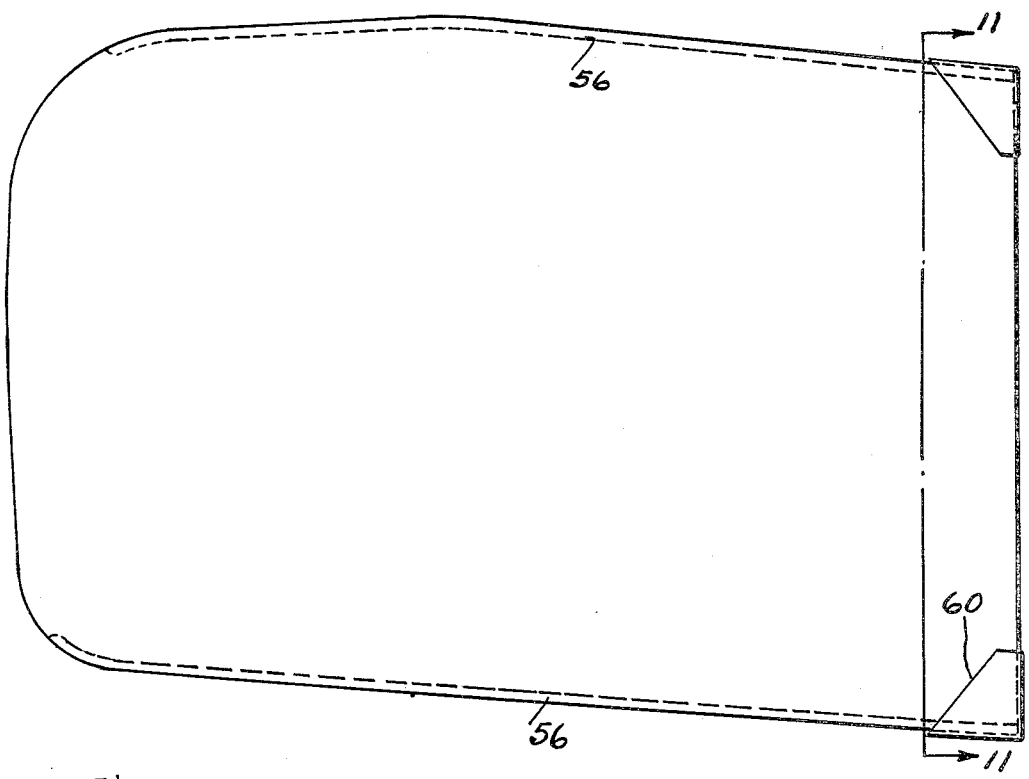
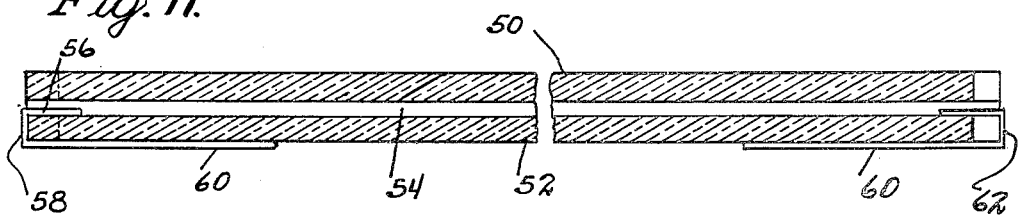
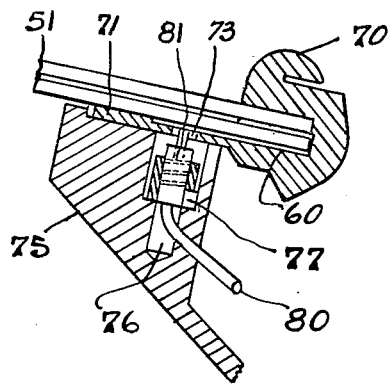
INVENTORS.
RICHARD F. RAYMOND and
BROOK J. DENNISON
BY Olen E. Bee
ATTORNEY.

Patented Apr. 15, 1952

2,592,601

UNITED STATES PATENT OFFICE 2,592,601

TRANSPARENT ELECTROCONDUCTIVE ARTICLE AND METHOD FOR PRODUCING THE SAME

Richard F. Raymond, Saxonburg, and Brook J. Dennison, Brackenridge, Pa., assignors to The Pittsburgh Plate Glass Company, Allegheny County, Pa., a corporation of Pennsylvania Application February 5, 1948, Serial No. 6,484

6 Claims. (Cl. 117—54)

This invention relates to the production of articles having novel electroconductive transparent coatings thereupon and to refractory articles such as glass which have such coatings deposited upon a surface or surfaces thereof.

In accordance with the present invention, novel refractory articles have been prepared which comprise a refractory base such as glass provided with an electroconductive coating of a cadmium oxide. Transparent articles have been provided which comprise a transparent glass or similar base having a transparent electroconductive cadmium oxide coating. Further in accordance with the present invention, a novel method of providing a base such as a glass base with a transparent electroconductive coating has been developed. According to this process, the glass or similar base is heated to a temperature above about 600° F., preferably above 800° F. but below the temperature at which the base tends to become molten, and the hot base is contacted usually by spraying with a cadmium compound such as cadmium bromide or cadmium acetate in the form of an emulsion or solution, of the compound, a vapor or solid dispersion thereof or other convenient state. Such contact normally is effected by spraying in atmospheric air and therefore in the presence of oxygen and atmospheric moisture. The maximum permissible temperature of the base varies according to the nature of the base. For example, when lime soda glass is to be coated a temperature of 800 to 1250° F. is suitable. When borosilicate glass is heated, higher temperatures up to about 1300 to 1400° F. are permissible.

The products which are obtained by this process are found to be coated with a thin transparent electroconductive film. This film is largely, if not entirely composed of cadmium oxide. The exact composition of the film is not known and it appears that some small amount of metallic cadmium atoms is distributed throughout a matrix of cadmium oxide. This seems probable in view of the fact that the conductivity of the film usually is somewhat superior to the electroconductivity of the cadmium oxide itself.

The process may be conducted by spraying the heated glass or similar sheet with an aqueous solution of the cadmium salt or other cadmium compound. For example, a saturated aqueous solution of cadmium acetate or cadmium bromide may be sprayed over the surface of the heated glass sheet. Alternatively, an organic solution of the cadmium salt may be used for this purpose. The amount of the solution so used normally is quite small since use of an excess of such a solution would tend to shock chill the surface and might tend to cool the glass sheet so rapidly as to cause fracture thereof or prevent substantial formation of the film. Usually, spraying the heated sheet for a few seconds for example 1 to 20 seconds with a fine spray will be suitable for the purpose.

In accordance with a further embodiment, the cadmium oxide electroconductive transparent film may be produced simply by exposing the heated glass to the action of a vapor of a cadmium compound such as cadmium nitrate.

The electroconductivity of the film thus produced and the adhesion of the film to the base appears to be influenced considerably by the nature of the cadmium compound which is used. Films which have been produced using aqueous solutions of cadmium acetate or cadmium bromide have been found to have the best adhesion and lowest electrical resistance. Electroconductive films which have somewhat poorer adhesion may be obtained using cadmium nitrate, or cadmium formate.

The conductivity of films which are produced from cadmium compounds such as cadmium acetate or cadmium bromide, is surprisingly good. Thus it has been discovered that films produced using these compounds has a resistance almost always below 500 ohms per unit square and generally not over about 100 to 150 ohms per unit square, frequently being as low as 15 ohms per unit square when cadmium acetate solutions are used. The expression of the electrical resistance in terms of ohms per unit square is a convenient means of expressing resistance of thin films. This resistance is, in fact, the specific resistivity of the film divided by the average film thickness within the unit square undergoing measurement. The films thus obtained are quite thin, usually being of the order of 50 to 800 millimicrons in thickness. Their specific resistivity has been found to be below 0.025 ohm-centimeters, usually being below 0.005 ohm-centimeters.

The production of cadmium oxide type films of the type herein contemplated frequently is facilitated by use of an oxidizing agent such as a peroxide, in conjunction with the cadmium compound in the coating operation. For example, it has been found that the use of a strong oxidizing agent in cadmium bromide solutions materially improves the conductivity of the film which is obtained on the glass base. Thus films having good conductivity and which do not rub off readily are obtained when aqueous cadmium bromide solutions containing an oxidizing agent, such as hydrogen peroxide, are used whereas when no oxidizing agent is present a much poorer product tends to be produced. Suitable oxidizing agents for this purpose include hydrogen peroxide, sodium peroxide and other water soluble conventionally known peroxides. These peroxides may be dissolved in the aqueous solution of the cadmium salt. Where an organic solution of the cadmium salt is used, organic peroxides such as benzoyl peroxide, acetyl peroxide, and acetone peroxide may be dissolved in the solution.

Other oxidizing agents having the oxidizing power of hydrogen peroxide such as perchloric acid or alkali metal perchlorates, or alkali metal perborates, alkali metal persulfates, alkali metal percarbonates, etc. may be used in lieu of hydrogen peroxide.

The following examples are illustrative of the methods of producing the coated products herein contemplated.

*Example I*

A polished plate glass sheet of lime-soda glass 4 inches by 8 inches by 7/64 inches was heated for 2¼ minutes at a furnace temperature of 1250° F. and suspended vertically in atmospheric air of normal humidity. 20 grams of a saturated aqueous solution of cadmium acetate was sprayed upon the heated glass plate at a pressure of about 40 pounds per square inch from a conventional atomizing spray gun and the plate was allowed to cool. The glass plate which was thus obtained had an electroconductive film which was transparent and which had a resistance of 150 ohms per unit square, the specific resistivity of the film being about 0.005 ohm-centimeters. The glass thus obtained was quite clear and transparent, having a light yellow cast.

*Example II*

The process of Example I was repeated using a mixture of a saturated aqueous solution of cadmium bromide and 30% hydrogen peroxide aqueous solution in the proportions of 2 parts by volume of the cadmium bromide solution to 1 part by volume of the peroxide solution. An adherent transparent coating was deposited on the glass base as in Example I and a transparent glass sheet was obtained having greater clarity and slightly less conductance than that of the product of Example I.

Other oxidizing agents such as perchloric acid and similar oxidizing agents may be used in conjunction with or in lieu of the hydrogen peroxide. When cadmium nitrate and cadmium formate were used in lieu of cadmium bromide or cadmium acetate in the above examples an electro-conductive film was obtained but the film was considerably less adherent to the glass base.

The above tests were made using plate glass which has the composition:

|  | Per cent by weight |
|---|---|
| $SiO_2$ | 71.52 |
| $Na_2O$ | 13.02 |
| $CaO$ | 11.62 |
| $MgO$ | 2.52 |
| $NaSO_4$ | 0.76 |
| $NaCl$ | 0.12 |
| $Fe_2O_3$ | 0.11 |
| $Al_2O_3$ | 0.33 |

Other lime-soda glasses which have the typical composition:

|  | Per cent by weight |
|---|---|
| $SiO_2$ | 71.38 |
| (usual variation 71 to 73% by weight) | |
| $Na_2O$ | 12.79 |
| (usual variation 12 to 14% by weight) | |
| $CaO$ | 9.67 |
| (usual variation 8 to 11% by weight) | |
| $MgO$ | 4.33 |
| (usual variation 3 to 6% by weight) | | may be used. Furthermore, the invention may be extended to the provision of coatings upon other glass products such as borosilicate glass, china, phosphate glass, lead X-ray glass, glass fiber, silicon carbide, aluminum oxide, mica, stone, tungsten carbide, and other refractory materials.

The invention herein described is capable of numerous uses. For example the cadmium oxide coated products herein described may be used as electrical resistance elements in various types of electrical circuits. Thus the coated articles herein described may be used as grid leaks in various radio circuits. Furthermore they may be used as heating elements in radiant electrical heaters simply by imposing an electric potential across the sheet and passing an electrical current there-through whereby heat is generated. Furthermore the cadmium oxide coated products may be used as glass insulators of the type described in U. S. Patent 2,118,795 granted to Jesse T. Littleton simply by substituting the conductive cadmium coating herein described for the tin oxide coating described by Littleton.

Electroconductive sheets of the type herein contemplated have been found to be especially valuable when used as windshields or viewing closures in the cabins or bodies of a vehicle such as an automobile or an airplane, dirigible or balloon.

Suitable articles of this character are described in the ensuing disclosure taken with the accompanying drawings in which:

Fig. 10 is a plan view drawn substantially to scale of another laminated panel suitable for use as a windshield;

Fig. 11 is a sectional view taken along lines 11—11 of Fig. 10;

Fig. 12 is a fragmentary view partially in section and diagrammatically illustrating the manner by which electrical contact is made with the panel of Fig. 10 when this panel is mounted in an automotive vehicle.

Figure 1:
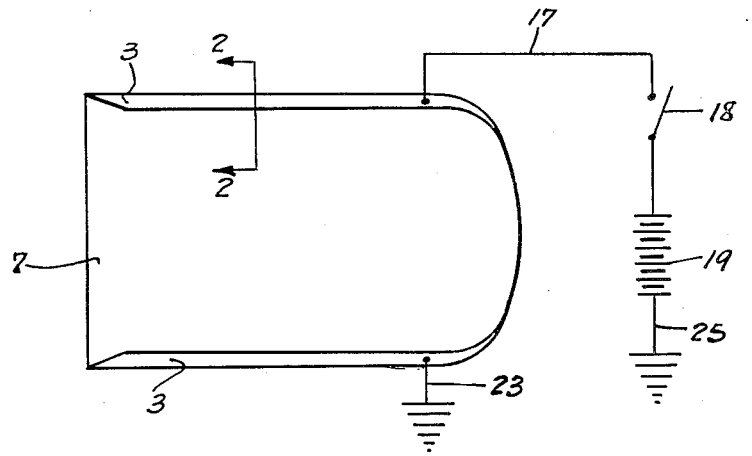
Fig. 1 is a diagrammatic plan view of a glass panel, suitable for use as a windshield of an automobile; embodying the coating produced according to the present invention.
Figure 2:
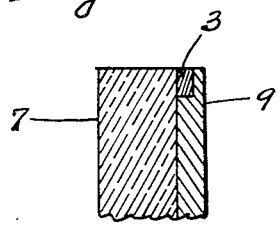
Fig. 2 is a diagrammatic fragmentary sectional view taken along lines 2—2 of Fig. 1.

In the drawings, Figs. 1 and 2 diagrammatically illustrate a heating panel having the wiring diagrammatically illustrated. This panel comprises a glass sheet 1 of generally rectangular shape having bus bars or conductive edge strips 3 of ceramic silver composition along opposite sides and close to the edges (preferably within 0.2 inch of the edge or on the edge) of the sheet. These bus bars are disposed along the longest pair of opposite sides of the panel whereby the distance between the bus bars is held to a minimum.

The panel is provided with an electroconductive transparent film 9 such as is formed by spraying a cadmium compound or similar compound on the heated panel as previously described. The bus bars are connected to a source of potential 19 by means of conductors 17, 23 and 25, one side of the potential source and one of the bus bars being grounded through conductors 25 and 23 respectively. The conductor 17 is provided with a suitable switch 18 for interrupting the flow of electric current to the film.

When the circuit is closed, electric current passes through the electroconductive transparent film and heat is generated by virtue of the resistance of the film. If desired a conventional thermostat or other heat responsive device may be provided to control the temperature of the film and to interrupt the flow of current by a suitably operated switch when the temperature exceeds a maximum. Usually it is desirable to limit the temperature to prevent establishment of an average temperature above about 350° F. in order to avoid damage to or loss of conductivity of the film. Where a safety glass type of assemblage (comprising a pair of glass sheets cemented together by a plastic such as polyvinyl acetal, one of the glass sheets having a conductive coating) is used the permissible temperature is lower and the temperature in such a case should not be permitted to rise above about 160–170° F.

In accordance with a suitable method of preparing a heating panel of the type illustrated in Figs. 1 and 2, a glass sheet 7 usually of window or plate glass or other flat glass structure is provided with conducting metal strips 3 suitable for bus bars adjacent the edges thereof and a conducting transparent coating 9. These metal strips should adhere firmly to the glass sheet and should have conductivity at least 10 to 20 times that of the conductive coating 9. In the preferred embodiment these metallized strips are produced by applying a metallized coating strip, usually 0.1 to 1 inch wide, upon the surface of the sheet to be treated. Such strips preferably are close to or on a pair of opposite edges thereof. This metallized coating must be capable of withstanding the temperatures and oxidizing conditions of treatment, and therefore should be of a ceramic character and further should be capable of glazing or otherwise forming an adherent, well-bonded coating to the glass. In general, these compositions comprise a highly conductive metal powder (preferably gold or silver) and a vitrifying binder. Typical ceramic conductive coating materials which may be used may have the following composition:

| | Percent by weight |
|---|---|
| 1. PbO | 7.5 |
| $B_2O_3$ | 1.0 |
| $SiO_2$ | 1.5 |
| Flake silver | 70.0 |
| French fat oil | 12.5 |
| Turpentine | 7.5 |
| 2. Finely divided silver | 72.6 |
| PbO | 9.3 |
| $SiO_2$ | 1.7 |
| $B_2O_3$ | 1.4 |
| Water | 7.5 |
| Ethyl alcohol | 7.5 |

In order to avoid production of bus bars which will develop in use excessive stresses in the glass, the thicknes of the coating to be applied should not exceed about 0.005 inch and preferably should be below about 0.003 inch.

After application of the metal bus bars to the glass sheet by painting or other method, the sheet is heated to the temperature at which application of the conductive coating may be effected, for example above about 600 to 800° F. but below the fusion point of the glass, usually 800 to 1250° F. During this heating operation the ceramic metal coating becomes glazed and is baked onto the glass so that a firm bond is established between the glass and the metal coating.

When the glass has been heated, for example in a furnace chamber having a temperature of 1050 to 1250° F. (for one or two minutes) it is withdrawn from the heating chamber and immediately is sprayed with the coating solution before substantial cooling of the glass sheet can take place. A quantity of the coating solution is placed in an atomizing spray gun and the heated glass sheet is sprayed with an atomized spray of this material for a brief period usually of the order of 2 to 20 seconds depending upon the thickness of film to be produced, the air pressure imposed upon the atomizing spray gun, etc. Usually this spraying operation is conducted in moisture and air or oxygen. However, conductive coatings have been obtained even when oxygen is essentially absent although it is probable that oxygen either from the atmosphere or combined in water or similar compound is essential to the operation.

Figure 3:
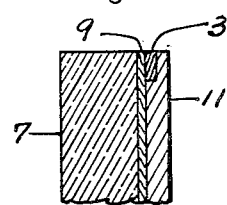
Figs. 3, 4 and 5 are diagrammatic sectional fragmentary views corresponding to Fig. 2 and illustrating various alternative embodiments which may be utilized in lieu of the embodiment illustrated in Fig. 2.

This process results in the production of a base 7 coated with a cadmium oxide electroconductive film 9 as illustrated in Fig. 2. According to a further embodiment as illustrated in Fig. 3, the glass base 7 may be provided with two or more conductive coatings 9, 11, etc. In such a case it has been found to be more advantageous to deposit the first cadmium oxide coating upon the glass base and then to deposit the metallized bus bar followed by deposition of the second cadmium oxide or similar conductive coating. In this embodiment the bus bars are disposed between a pair of coatings. In either case however the bus bar is disposed between the glass base and the transparent conductive coating.

Figure 4:
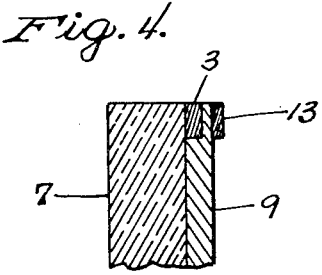
Figure 5:
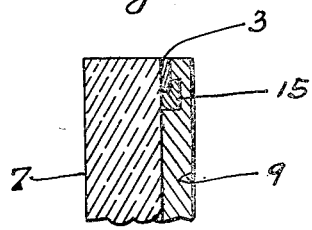
Figure 6:
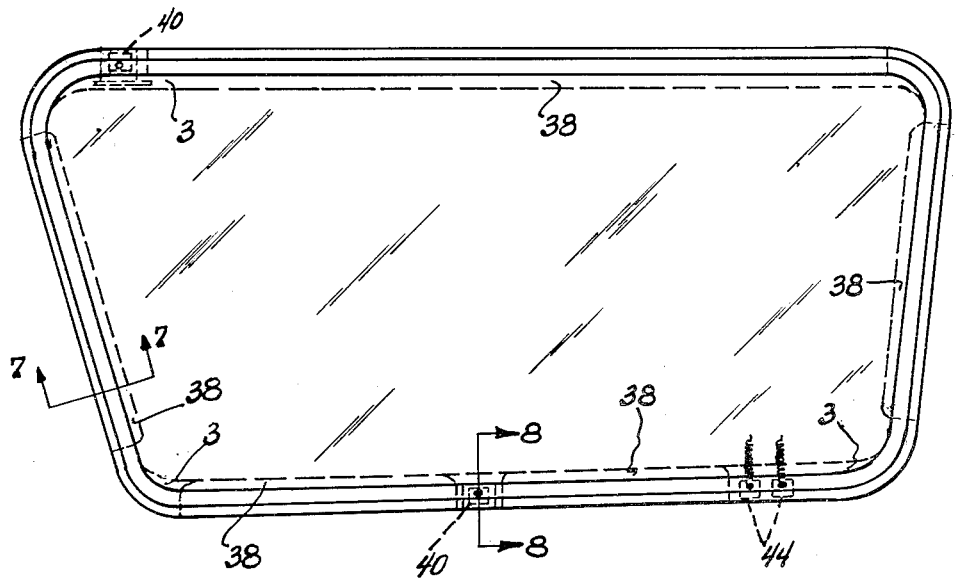
Fig. 6 is a plan view drawn substantially to scale of a typical laminated safety glass panel suitable for use in the cabins of aircraft and having an electroconductive transparent coating on the surface of one of the glass sheets thereof.
Figure 7:
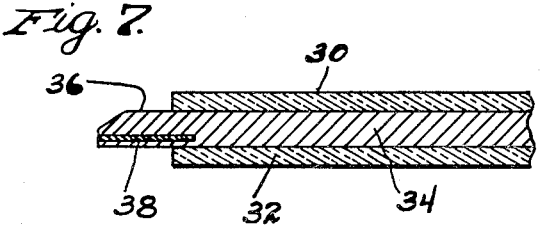
Fig. 7 is a fragmentary sectional view taken along lines 7—7 of Fig. 6.
Figure 8:
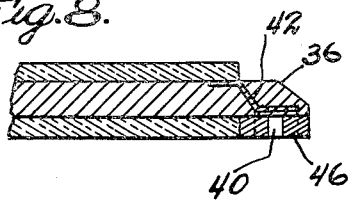
Fig. 8 is a fragmentary sectional view taken along lines 8—8 of Fig. 6.
Figure 9:
Fig. 9 is a fragmentary view of an edge of the laminated panel of Fig. 6 showing the terminals along the lower edge of the panel.

The invention herein may be used in connection with other embodiments. Typical additional embodiments are illustrated in Figs. 4 and 5. As illustrated in Fig. 4, it is frequently desirable to reinforce the ceramic metal bus bar with an additional metal coating after deposition of the conductive transparent film. This is particularly true where the transparent film is deposited as a single coat. Thus a glass base 7 may be provided with bus bars 3 and a transparent cadmium oxide coating 9 and thereafter a reinforcing coating 13 of a conductive metal paint or paste such as an air drying cement comprising a conductive metal powder, such as silver, copper, gold, etc. and an air drying binder (linseed oil, air curing resins, etc.) may be deposited upon the bus bar or the coating over the bus bar. Furthermore a reinforcing layer of copper, silver or other conductive metal may be deposited by other means such as by electrodeposition, cathode sputtering, dipping, spraying, etc. This reinforcement very substantially improves the conductivity and electrical contact between the bus bar and the conductive transparent coating.

Fig. 5 illustrates an embodiment which is particularly adapted for the establishment of superior electrical contact between the bus bar and the coating. I have found that, when silver is used as the bus bar material, the deposition of the conductive cadmium oxide or similar coating appears to be hindered and tendency exists for the coating to be substantially thinner immediately adjacent to the silver bus bar. This reluctance of the conductive film to deposit adjacent to the silver frequently results in the establishment of localized areas having an unusually high resistance immediately adjacent to the bus bar.

According to the present invention it has been found that when gold is used as the bus bar material this difficulty is not encountered and consequently the substitution of gold for silver sometimes is resorted to. However, in order to conserve the amount of gold used applicant has found that an advantageous avoidance of the thinning out of the coating may be attained by use of a very narrow coating of gold along the inner edge of the bus bar. As shown in Fig. 5, a glass base 7 is provided with the usual silver metal bus bar 3 and a narrow strip 15 of gold is deposited along the inner edge of the bus bar 3 and extending inward and overlapping or covering the edge of the bus bar 3. Thereafter the transparent coating 9 is deposited in the usual manner the coating being in contact with the gold strip 15 rather than the bar 3. As a further embodiment the gold strip may be deposited first and the silver deposited thereafter to leave an inner gold margin which is in electrical contact with the transparent conductive film.

In Figs. 2 to 5 inclusive the cadmium oxide or similar electroconductive transparent coatings 9 and 11 are shown as thinning out over the bus bars 3. This showing is purely diagrammatic. As previously noted only a slight amount of cadmium oxide tends to deposit upon the bus bar itself. Often a clearly detectable deposite of the oxide coating on the bus bar may be observed. In other cases the deposit may be so slight as to be unobservable.

The structures herein contemplated have been found to be highly suitable for installation as windshields or view closures in the vehicle bodies of airplanes, automobiles, railway vehicles, etc. and the passage of electrical current through the conductive film maintains the film at an elevated temperature sufficiently high to minimize or prevent deposition of snow or ice or fog upon the viewing closure or windshield. The magnitude of electrical potential which should be established across the bus bars in order to remove the fog, snow and/or ice will vary largely with the conditions of operation and will depend to a very great degree upon the external temperature and also upon the velocity of the air flowing over the shield or closure. This limiting temperature may be controlled simply by insertion of a conventional thermostatic control (not shown) in the electrical circuit or by limiting the voltage according to the resistance and power requirements or by other means.

Figs. 6 to 9 inclusive, drawn substantially to scale, illustrate an embodiment of this invention which is especially adapted for use as a viewing closure or window in the cabin of an airplane. The panel therein shown comprises a pair of glass sheets 30, 32 which are bonded together with an interlayer 34 of a transparent, tough, flexible, elastic, rubberlike compressible essentially waterproof adherent plastic such as polyvinyl butyral, cellulose acetate, or other convenient interlayer including other vinyl acetals and other vinyl polymers such as vinyl acetal, vinyl acetate, styrene, etc. Since this interlayer is larger in longitudinal and lateral dimensions than the glass sheets 30 and 32, the interlayer extends outward from the edges of the glass sheets to provide a peripheral rim or margin 36. This rim may be reinforced by aluminum strips 38 (Fig. 7) which are embedded therein. This general structure and the manner of mounting the panel in the cabin of an airplane is described more fully in United States Letters Patent No. 2,293,656, granted to T. H. McClain.

Glass sheet 32 is provided with a transparent electroconductive coating (not shown) on its inner side which is in contact with the plastic interlayer. This sheet is generally of the structure illustrated in Figs. 1 to 5 inclusive and is provided with silver bus bars 3 extending along opposite edges thereof. These bus bars are tapered at each end and have the external contour of the glass sheet. They extend substantially completely around the curved edges of the sheet and the taper terminates in a point substantially where the edge of the sheet ceases to be curved.

Frequently, sheets 30 and 32 may be partially tempered after coating to reduce possibility of fracture in use. Often the sheet having the electroconductive coating is tempered to a degree less than that in the uncoated sheet 30. For example, the uncoated sheet may be tempered to about one half of full temper and the sheet 32 tempered to about ¼ to ⅓ of full temper. This tempering frequently tends to reduce the stress which is imposed upon the coating and which normally exists due to the differences in thermal expansion coefficients between the glass and the coating.

Terminals 40, 40 which are in electrical connection with each bus bar are embedded in the rim portion 36 of the interlayer and extend partially therethru. These terminals are tapped to accommodate a screw for connection to a conduit attached to a source of potential. The terminals are each connected to a respective bus bar by means of a connector 42 of copper or similar conductive material which is soldered to the embedded end of the terminal and also to the bus bar (see Figs. 8 and 9).

If desired, a similar pair of spaced conductive terminals 44 of copper or the like are embedded in the interlayer rim on one side of the safety glass panel and spaced from the terminal 40. These terminals 44 may be connected to a resistor which varies in its resistance directly with the temperature. This resistor may be placed against the panel so that its resistance will be a function of the temperature of the panel. Thus the electrical potential imposed across the bus bars may be controlled in accordance with the temperature of the panel simply by connecting the thermal resistor in an auxiliary circuit provided with conventional relays and devices whereby to interrupt or control current flow through the primary heating circuit, when the temperature of the film reaches a predetermined value.

All of the terminals 40 and 44 are located in unreinforced portions of the interlayer rim 36 and project outwardly from the interlayer a short distance generally sufficient to be essentially flush with the outer surface of the glass sheet 30. The outer end of each terminal is surrounded with a protective ring 46 of polyvinyl acetal or similar material.

In the use of this panel, the panel is mounted in an airplane cabin in the conventional manner and the terminals 40 are connected to a suitable potential source. When a potential is established across the bus bars 3 electric current passes through the electroconductive transparent film heating the film and preventing or at least minimizing formation of fog and/or ice on the surface of the panel. To prevent damage to the film the temperature of the film and the plastic is prevented from exceeding about 160 to 170° F. This may be accomplished by breaking the circuit manually or by a thermostatic switch or by use of a resistor, the resistance of which varies directly with the temperature as previously described.

Figs. 10 and 11 illustrate a panel adapted especially for an automobile. These drawings illustrate a safety glass panel 51 comprising a pair of glass sheets 50 and 52 cemented together by a plastic interlayer 54 such as polyvinyl butyral. The inner surface of sheet 52 is provided with a transparent electroconductive coating and a pair of bus bars 56 in contact with the coating and running along opposite edges of the sheet. Thus, the interlayer is in direct contact with the electroconductive coating.

Suitable means for applying potential between the bus bars and across the film are provided at the corners of the panel. In the embodiment shown in Figs. 10 and 11 a portion of the edge and outer surface (usually located at a corner of the panel) is coated with a conductive coating such as a ceramic silver coating similar in composition to that of the bus bars. This conductive edge 62 and outer conductive coating 60 is continuous (or substantially so) with the coating comprising the bus bar and the outer conductive presents an electroconductive surface having substantially greater width (usually two or more times), than the width of the bus bar. This affords a good contact surface for establishing electrical contact with a potential source and establishment and maintenance of the potential across the bus bars.

The manner in which electrical contact is made with the panel of Fig. 10 is illustrated in Fig. 12. This figure is a fragmentary view showing an end of the panel 51 as is mounted in a soft rubber channel 70 which extends completely around the periphery of the panel. This channel is provided with an elongated lip portion 71 which extends along the lower margin of the inner surface panel and which bears against the supporting surface of the cowl 75 to support the windshield in a conventional manner. The lip 71 has an aperture 73 which exposes a small portion of the metallized coating 60. A tubular conduit 77 which has a ledge 79 extends through the cowl and mates with the aperture 73. Electrical contact is established by an electrical conductor 80 which extends through the conduit 77 and terminates in a spring contact 81. This contact is held in place and is supported by the ledge 79. Its conductive end bears resiliently against the conductive face 60 by virtue of the contact spring as will be fully understood by those skilled in the art.

Various features of the articles herein described may be modified within the scope of this invention. As an example various types of ceramic metallizing compositions preferably those which have a thermal coefficient of expansion approximately that of the base may be used for production of the bus bars. Such compositions may comprise a finely divided highly conductive metal disposed in a binder which is capable of establishing adhesion to the glass base and/or the coating and which is also capable of resisting heat and decomposition at 900 to 1500° F. For most purposes it is found desirable to utilize a vitrifying flux or binder which is capable of forming a glass or glass-like product upon fusion or heating to high temperature. Thus, aqueous suspensions or dispersions of hydrated colloidal silica, sodium silicate or other alkali metal silicate, or alkali metal or beryllium metaphosphates or meta borates, boron oxides, borosilicate forming compositions including lead borosilicate compositions, etc. are suitable for this purpose. Various other vitrifying glass forming adhesive compositions which are capable of withstanding heating at 900 to 1200° F. also are capable of use. Furthermore, strips or foils of metal may be bonded by a glaze or vitrifying binder for use as a bus bar.

Although the invention has been described particularly with reference to the use of silver or gold compositions dispersions of other electroconductive metals including platinum, palladium, indium, irridium, rhodium, tungsten, etc. which resist oxidization may be used.

Furthermore, these ceramic bus bars may be reinforced as previously stated by a further coating of a conductive metal including the conductive metals above mentioned, copper, zinc, graphite, etc. in concentration sufficient to render a coating thereof highly conductive.

The bus bars at all events should be many times more conductive than the transparent films in order to prevent or avoid establishment of an undue amount of hot spots. For most purposes the total resistance of each bus bar should be not more than 1 to 5 percent of the resistance of the transparent coating between the bus bars.

Although the present invention has been described with reference to the specific details of certain embodiments thereof, it is not intended that such details shall be regarded as limitations upon the scope of the invention except insofar as included in the accompanying claims.

What is claimed:

1. A method of providing a base with a transparent electroconductive coating which comprises heating the base at a temperature above about 600° F. but below the temperature at which the base melts, and coating a hot surface thereof with an aqueous solution of cadmium bromide and a peroxide.

2. A method of providing a base with a transparent electroconductive coating which comprises heating the base at a temperature above about 600° F. but below the temperature at which the base melts, and coating a hot surface thereof with a solution of cadmium bromide, such solution containing a peroxide dissolved therein.

3. The process of claim 2, wherein the peroxide is hydrogen peroxide.

4. A method of providing a glass base with a transparent electroconductive coating which comprises heating the base at a temperature above about 600° F. but below the temperature at which the base melts, and contacting a hot surface thereof with an aqueous solution of cadmium bromide and a peroxide.

5. A transparent refractory base having an adherent transparent continuous film of a thickness of the order of 50 to 800 millimicrons and consisting substantially entirely of electroconductive cadmium oxide, said film having a specific resistivity below about 0.025 ohm-centimeters.

6. A transparent glass base having an adherent transparent continuous film of a thickness of the order of 50 to 800 millimicrons and consisting substantially entirely of electroconductive cadmium oxide; said coating having a specific resistivity below about 0.005 ohm-centimeters.

RICHARD F. RAYMOND.
BROOK J. DENNISON.

REFERENCES CITED

The following references are of record in the file of this patent:

UNITED STATES PATENTS

| Number | Name | Date |
|---|---|---|
| 1,727,492 | Teats | Sept. 10, 1929 |
| 2,194,189 | Wheeler et al. | Mar. 19, 1940 |
| 2,274,955 | Dykstra | Mar. 3, 1942 |
| 2,429,420 | McMaster | Oct. 21, 1947 |